United States Patent [19]
Dicke

[11] Patent Number: 5,044,853
[45] Date of Patent: Sep. 3, 1991

[54] THREAD-CUTTING SCREW

[75] Inventor: Robert Dicke, Ennepetal, Fed. Rep. of Germany

[73] Assignee: Erwin Rommel, Fed. Rep. of Germany

[21] Appl. No.: 510,961

[22] Filed: Apr. 19, 1990

[30] Foreign Application Priority Data

Apr. 25, 1989 [DE] Fed. Rep. of Germany ... 8905189[U]

[51] Int. Cl.$^5$ .............................................. F16B 39/30
[52] U.S. Cl. ..................................... 411/311; 411/386; 411/417
[58] Field of Search ............... 411/386, 387, 187, 310, 411/311, 417; 408/215-222

[56] References Cited

U.S. PATENT DOCUMENTS

| 3,247,877 | 4/1966 | Evans | 411/311 |
| 3,370,501 | 2/1968 | Angingh | 411/387 |
| 3,982,575 | 9/1976 | Ollis, Jr. et al. | 411/310 |
| 4,259,889 | 4/1981 | Capuano | 411/386 |
| 4,645,396 | 2/1987 | McCauley et al. | 411/387 |
| 4,818,165 | 4/1989 | Shirai | 411/386 |

Primary Examiner—Neill R. Wilson
Attorney, Agent, or Firm—Jones, Askew & Lunsford

[57] ABSTRACT

A thread-cutting screw where the edge of the screw is at least partially undulating. The undulating edge has recesses in the shape of a parabola interrupting the flank face of the thread. The recesses are asymmetrical so that the front flank face of the recess in the screw-in direction is steeper than the rear flank face in the screw-in direction, so that unscrewing the screw is more difficult than screwing-in the screw.

4 Claims, 2 Drawing Sheets

THREAD-CUTTING SCREW

BACKGROUND OF THE INVENTION

The present invention concerns a thread-cutting screw with a single thread or multiple threads, a screw tip and a screw head where the edge forming the screw tip is at least partially undulating and the thread runs to the end of the screw tip and the undulating thread tip has indentations that interrupt the flank surface at least on its flank surface facing the screw tip and whose upper limit is the edge itself on the screw tip and at least on the first adjacent flight of the screw shaft.

Such a screw is already known from German Patent Application P 33 35 092.2. In this known slotted screw, the indentations are designed so they are symmetrical with the midline of the wavy edge so the indentations are shaped as symmetrical paraboloids. This known slotted screw has a reduced screwing moment and an increased unscrewing moment in comparison with those known in the past.

SUMMARY OF THE INVENTION

The present invention is based on the problem of improving this known screw in such a way as to yield a further reduction in screwing moment with a simultaneous increase in unscrewing moment.

According to this invention, this is accomplished by the fact that the indentations are arranged symmetrically, so their front flank face in the screw-in direction is steeper than the rear flank face as seen in the screw-in direction. It is also expedient here for the transition from the indentations to the flank face to be in the shape of a parabola whose axis is shifted by an acute angle α in the screw-in direction toward the midline of the wavy edge forming the upper limit and running through the longitudinal axis of the screw.

It is also expedient for the indentations to be designed so they are opposite each other on both flank faces of the flight. Due to the design according to this invention, the resistance is thus lower when screwing in the screw due to the flatter design of the rear part of the parabola as seen in the screw-in direction, whereas unscrewing the screw according to this invention is more difficult due to the steeper arrangement of the parabola surface positioned farther forward in the screw-in direction.

On the basis of the practical example shown in the accompanying figures, this invention will now be explained in greater detail.

DESCRIPTION OF THE PREFERRED EMBODIMENT

Figure 1:
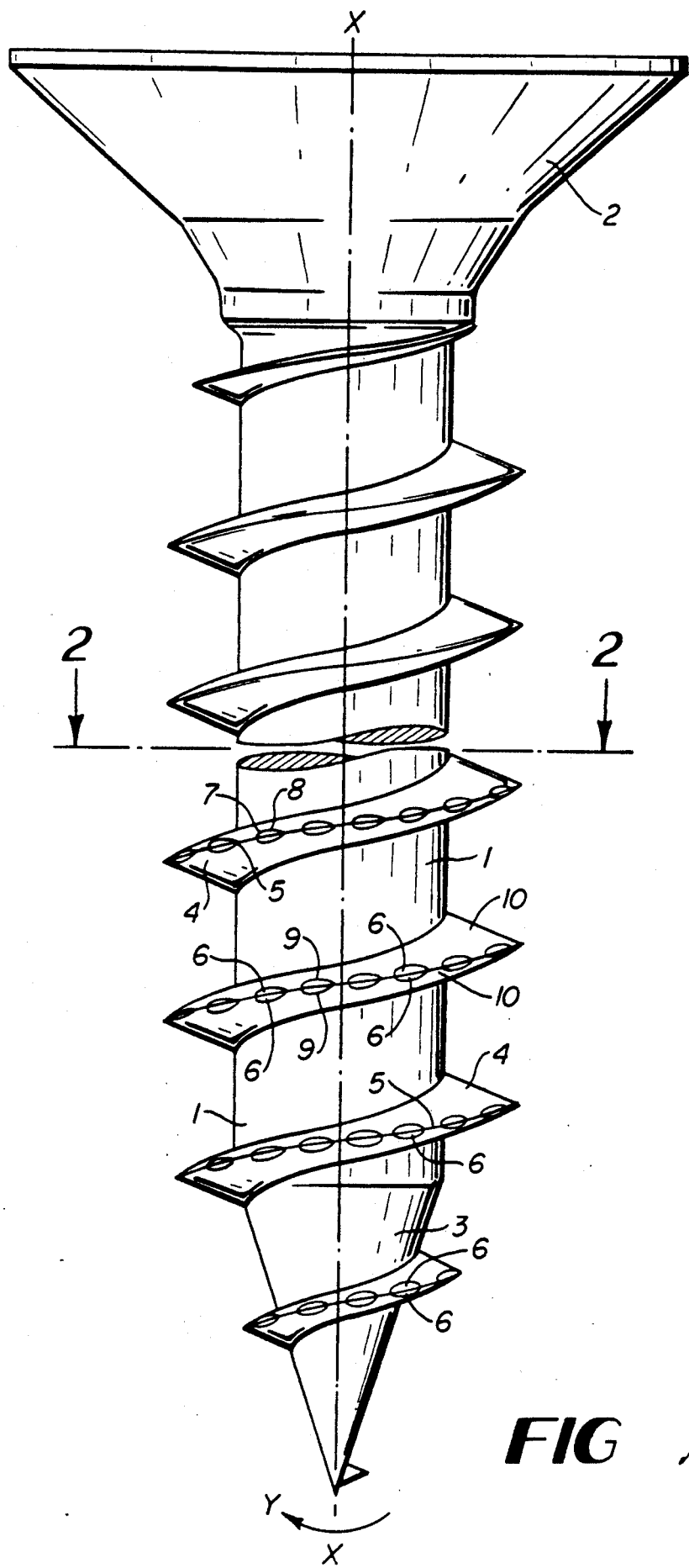
FIG. 1 shows a partial view of a screw according to this invention.
Figure 2:
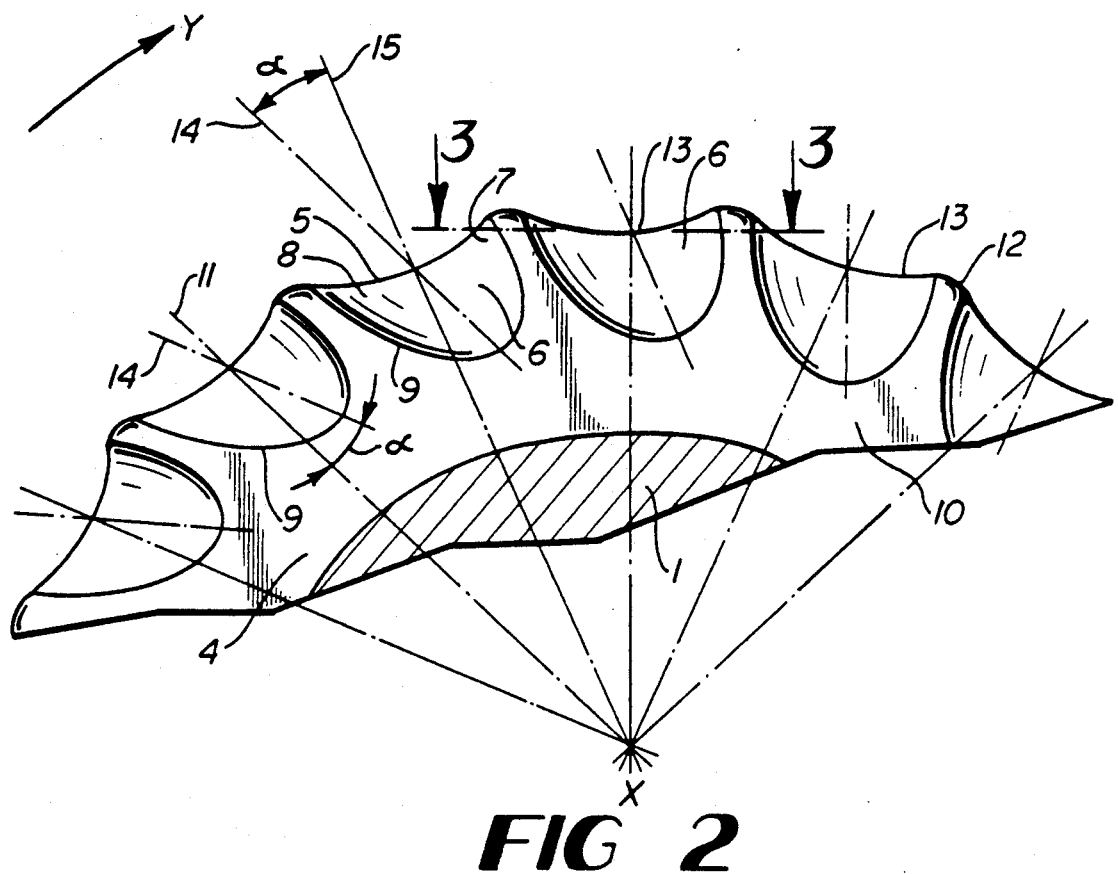
FIG. 2 shows a partial section along line 2—2 in FIG. 1.
Figure 3:
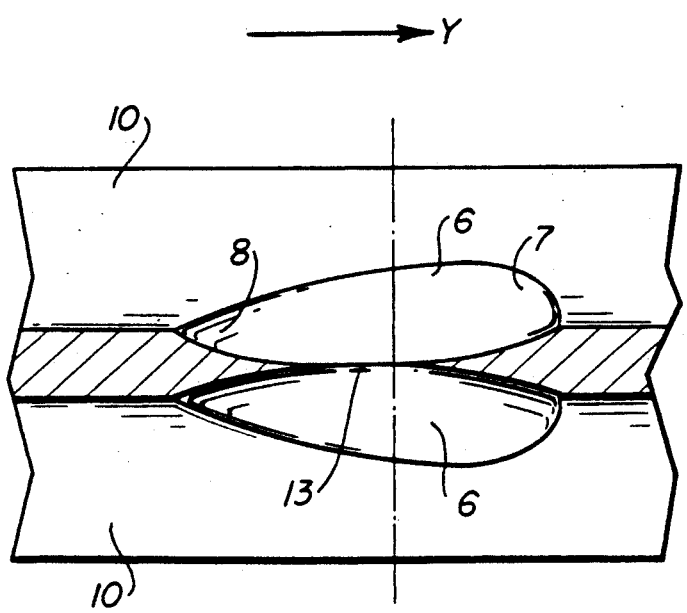
FIG. 3 shows a partial section through a indentation in the flank face of the screw according to FIG. 1 along the line of intersection 3—3 in FIG. 2.

As FIG. 1 shows a screw according to this invention consists of a screw shaft (1), a screw head (2) and a simple slit or cross-slit plus a screw tip (3). Screw shaft (1) has the same diameter over its entire length and screw tip (3) tapers continuously to the end of the screw shaft. A screw thread (4) running to the end of screw tip (3) is provided on screw shaft (1) and screw tip (3). Edge (5) of the flights that form thread (4) follows an undulating pattern, i.e., there is a smooth sequence of elevations (tips of the waves (12)) and indentations (valleys of the waves (13)) and the outside diameter of the thread is determined by the distance of thread edge (5) from the central axis of the screw in the area of the tips of the waves (12). In addition, recesses (6) are also formed in the area of the valleys (13) in the thread edge (5) at least on the face (10) of each flight facing the tip of the screw. Edge (5) in the area of the respective valley (13) forms the upper limit of recesses (6). As indicated by FIG. 2 in combination with FIG. 3, the recesses (6) are designed so they are asymmetrical, so their flank face (7) which faces in the screw-in direction of the screw according to this invention is steeper than the rear flank face (8) as seen in the screw-in direction of the screw. The transition (9) to the other flank face of thread flank (10) is designed as a parabola here. Axis (14) of the parabola is shifted toward midline (15) of the wavy edge (5) forming the upper limit running through the longitudinal axis X—X of the screw by an acute angle α in this screw-in direction. Preferably, there is a pitch of the recesses over one flight of about 8 to 13 recesses (6). The recesses (6) may be located over the entire area of the thread, i.e., even on the tip of the screw itself. The depth of recesses (6) is preferably ⅓ to ½ the height H of the thread. As shown by the figures, there is a fluid transition between recesses (6) and the remaining area of the thread flank, so there are no sharp edges and thus a cutting effect is prevented. The same thing is also true of the transition between valleys (13) and peaks (12) of edge (5) where the valleys (13) form the border of recesses (6). The peaks (12) are designed so they are relatively short in comparison with the valleys.

In the practical example illustrated in FIG. 1, the recesses (6) are arranged so they are opposite each other and are symmetrical with edge (5). However, it is also within the scope of this invention to provide recesses (6) on flank faces on only one side.

What is claimed is:

1. Thread-cutting screw with a thread (4) extending over at least part of the shaft of the screw, with a screw tip and a screw head, where the edge (5) of the thread is at least partially undulating and the thread runs to the end of the tip of the screw, and the undulating edge of the thread has recesses (6) interrupting the flank face (10) of the thread on at least the flank face that faces the tip of the screw, in the section of the valleys of the undulating edge and at least on the screw shaft next to the tip of the screw, where the upper border of these recesses is the edge (5) of the thread, characterized in that:

the recesses (6) are in the shape of a parabola (9) and are asymmetrical, and the front flank face (7) of the recesses in the screw-in direction is steeper than the rear flank face (8) in the screw-in direction.

2. Thread-cutting screw according to claim 1, characterized in that the axis (14) of the parabola (9) is shifted in the screw-in direction by an acute angle α toward midline (15) running through the longitudinal axis X—X of the screw, where said midline belongs to the undulating edge (5) that forms the upper border.

3. Thread-cutting screw according to claims 1 or 2, characterized in that the distance between the recesses (6) becomes smaller toward the acute end in the area of the screw tip (3).

4. Thread-cutting screw according to claim 1, characterized in that the recesses are designed so they are opposite each other on two thread flanks (10) of flight (4).

* * * * *